June 2, 1970 R. PATZELT ETAL 3,515,872
PHOTOMULTIPLIER WITH INWARDLY CONVEX PHOTOCATHODE FOR
LOW-LEVEL SCINTILLATION COUNTING
Original Filed Feb. 1, 1967 2 Sheets-Sheet 1

INVENTORS
RUPERT PATZELT
HORST HALLING
BY
AGENT

INVENTORS
RUPERT PATZELT
HORST HALLING
BY
Frank R. ...
AGENT 3,515,872
PHOTOMULTIPLIER WITH INWARDLY CONVEX PHOTOCATHODE FOR LOW-LEVEL SCINTILLATION COUNTING
Rupert Patzelt, Vienna, and Horst Halling, Wiener Neustadt, Austria, assignors, by mesne assignments, to U.S. Philips Corporation, New York, N.Y., a corporation of Delaware
Continuation of application Ser. No. 613,141, Feb. 1, 1967. This application Apr. 29, 1968, Ser. No. 725,229
Claims priority, application Austria, Feb. 8, 1966, A 1,144/66
Int. Cl. G01t 1/204
U.S. Cl. 250—71.5                              1 Claim

ABSTRACT OF THE DISCLOSURE

A photomultiplier tube for low-level scintillation counting with discrimination against noise pulses in which a transparent photocathode is spaced from a first dynode in such manner that there is a systematic spread in the time of flight between the photocathode and the first dynode for electrons originating from different points of the photocathode, the time differences in the arrival of electrons at the first dynode determining the pulses to be counted.

---

Figure 1:
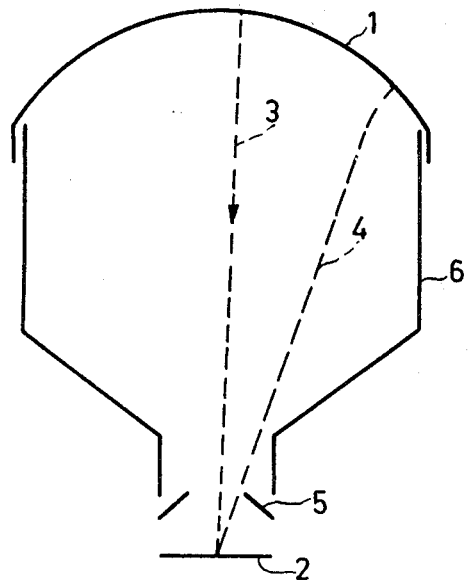

This is a continuation of Ser. No. 613,141, filed Feb. 1, 1967, now abandoned.

The present invention relates to an arrangement, including a photomultiplier tube having a transparent photocathode, for low-level scintillation counting with discrimination against pulses due to noise. The invention particularly concerns a photomultiplier tube for such an arrangement.

Low energy rays, for instance β-rays from tritium, cause weak scintillations in such an arrangement and therefore release only few photoelectrons from the photocathode of the photomultiplier tube. They basically can be distinguished from noise pulses only if at least two photoelectrons are released due to one scintillation and the discrimination between noise and particle-induced pulses can be achieved on the basis of pulse-height (collected charge) or a direct evidence of the release of two or more photoelectrons.

The known arrangements including a conventional photomultiplier tube and pulse-height discrimination apparatus are very impractical for the measuring of such rays. This is due to the wide spread in the height of single-electron pulses and the consequent overlapping of the pulse-height distributions of pulses from one and two electrons in a broad range.

Other known arrangements include more than one photomultiplier tube in order to allow discrimination between noise and particle-induced pulses by means of a coincidence-method. The need for a second photomultiplier tube and the low counting efficiency of these arrangements present serious disadvantages.

It is an object of the invention to provide a new and relatively simple arrangement for low-level scintillation counting having improved efficiency.

In accordance with the invention, in an arrangement, including a photomultiplier tube having a transparent photocathode, for low-level scintillation counting with discrimination against pulses due to noise, there is a systematic spread in the time of flight between the photocathode and the first dynode of the photomultiplier tube for electrons originating from different points of the photocathode, the time differences in the arrival of electrons at the first dynode determining the pulses to be counted.

This arrangement allows pulse-shape discrimination between noise and scintillation pulses with high efficiency. If two or more electrons resulting from one scintillation are released from the photocathode, the probability is high, that they are released at different points and arrive at different times at the first dynode due to the different times of flight with the result that a pulse appears at the anode, which can be distinguished from a single-electron pulse by means of pulse-shape-discrimination. The arrangement combines the advantages of the two-multiplier-coincidence arrangements with the simplicity of the one-multiplier arrangements.

In a first embodiment of a photomultiplier tube convenient for an arrangement according to the invention the photomultiplier tube has a flat photocathode.

In another embodiment of a photomultiplier tube convenient for an arrangement according to the invention the photocathode as seen from the first dynode is convex.

In these first and second embodiments the geometric relations are such that the paths covered by electrons from different points of the cathode to the first dynode have a spread in length. Consequently in operation of the tube a systematic spread in time of flight is introduced.

In a particular embodiment of a photomultiplier tube convenient for an arrangement according to the invention the photomultiplier tube comprises a particular electron lens system between the photocathode and the first dynode by means of which the desired spread in time of flight may be achieved by applying appropriate voltages.

The dynode structure of the photomultiplier tube essentially being so as to have a minimum spread in times of flight between the first dynode and the anode in order to have a minimum pulse-width of single electron pulses may have a configuration as known from the prior art.

The invention will be described with reference to the accompanying drawing.

Each of the FIGS. 1–5 schematically shows a part of a photomultiplier tube.

Figure 6:
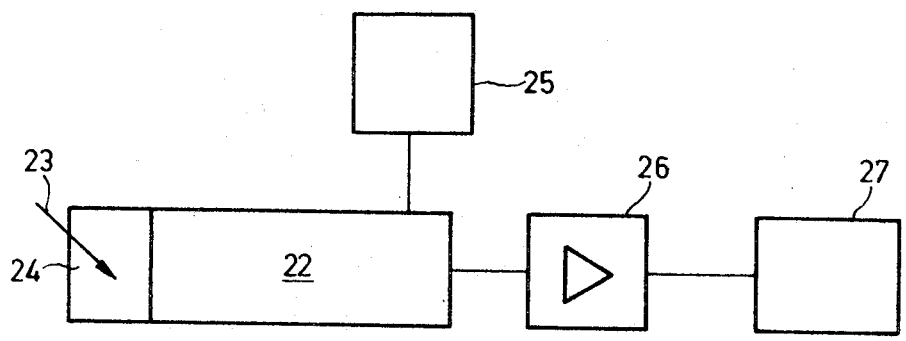

In FIG. 6 a block-schematic diagram of an arrangement according to the invention is represented.

Figure 7:
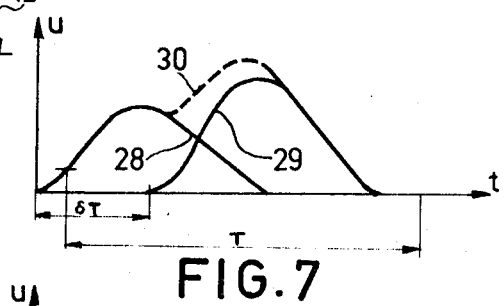
Figure 8:
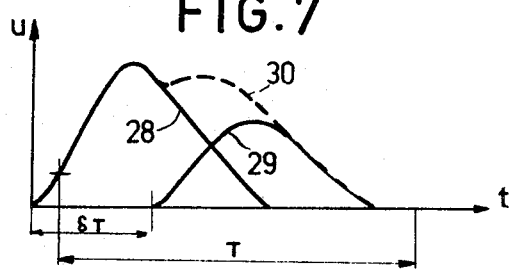

In FIGS. 7 and 8 examples of pulses appearing at the anode of the photomultiplier tube in an arrangement according to the invention is represented.

FIG. 1 shows a part of a photomultiplier tube as known in the prior art. It has a photocathode 1 and a first dynode 2. For the sake of simplicity neither the rest of the dynodes nor the anode are shown. There are shown two electron paths, 3 and 4, between the photocathode 1 and the first dynode 2. Further are shown a focussing lens 5 and a part of the enclosure of the tube 6. The electron paths between the photocathode and the first dynode (for example 3 and 4) substantially have the same length. In this photomultiplier two electrons, which are released from the photocathode at the same time, will arrive at the first dynode 2 at substantially the same time.

Figure 2:
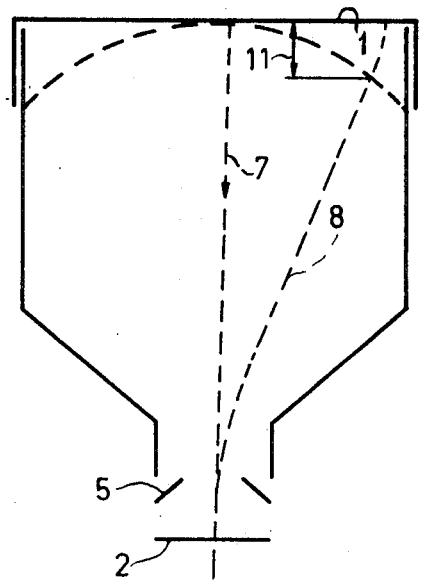

FIG. 2 shows a corresponding part of a photomultiplier tube for an arrangement according to the invention. This photomultiplier tube has a flat photocathode 1. The electron paths between the photocathode 1 and the first dynode have a different length. There are shown for example the electron paths 7 and 8 and their difference in length is indicated by 11. Electrons, which are released from different points of the cathode at the same time, will arrive at the first dynode 2 with a systematic time-spread.

Figure 3:
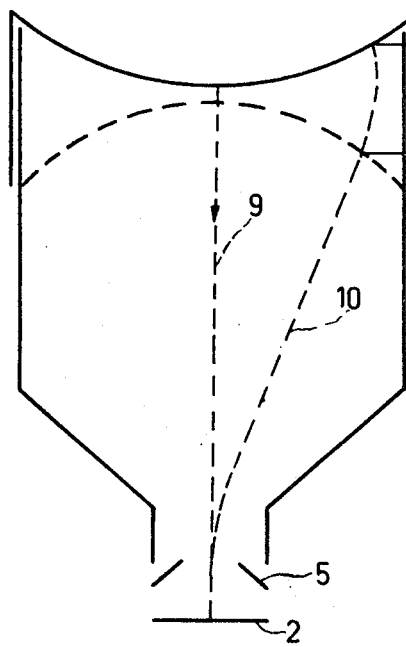

FIG. 3 shows a corresponding part of another embodiment of a photomultiplier tube for an arrangement according to the invention. The photocathode 1 as seen from the first dynode 2 is convex and this figure shows again electron paths of different length, 9 and 10. The difference in length of the electron paths is, like in FIG. 2, due to the geometric form of the photocathode. The difference in length between 9 and 10 is indicated by 12.

Figures 4, 5:
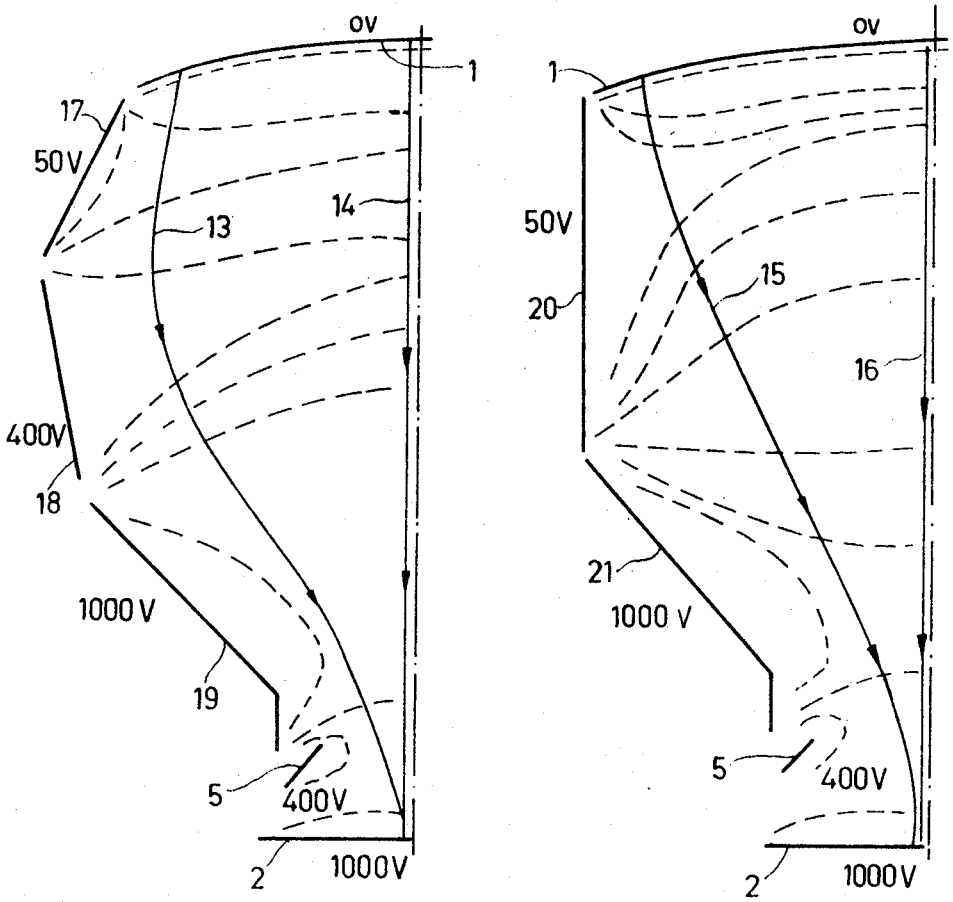

FIG. 4 shows a part of a photomultiplier tube for an arrangement according to the invention wherein a systematic spread in the time of flight of the electrons flying from the cathode 1 to the first dynode 2 is achieved by means of an electron lens system (17, 18, 19). The electrodes 17, 18 and 19 have potentials of respectively 50, 400 and 1000 volts, the focusing electrode 5 has a potential of 400 volts and the first dynode has a potential of 1000 volts. All potentials are given with respect to the cathode potential. The dashed lines are equipotential lines and 13 and 14 are electron paths which are covered in essentially different times.

For sake of clarity FIG. 5 shows a corresponding part of a photomultiplier tube having a conventional lens system substantially avoiding a spread in time of flight. The electrode 20 and the electrode 21 have respectively potentials of 50 volts and 1000 volts with respect to the cathode. The electron paths between the photocathode 1 and the first dynode 2, for example the paths represented by the lines 15 and 16 are covered by electrons in substantially the same time.

The block-schematic diagram in FIG. 6 represents a photomultiplier tube 22, incident low energy β-rays 23 from tritium producing flashes of lightning in the liquid scintillator 24, the voltage supply 25, an amplifier 26 and a pulse-shape discriminator 27. The events occurring at the anode of the photomultiplier tube 22 are illustrated in FIG. 7 and FIG. 8.

In the diagram in FIG. 7 the ordinate represents the voltage U and the abscissae represents the time $t$. When a single electron is released from the cathode it flies to the first dynode and causes secondary emission of a number of electrons. This number is multiplied at the successive dynodes and finally a voltage pulse like 28 appears on the anode. The width of such a pulse is very small (about 2 nsec.) due to the fast dynode structure. A second pulse due to a single electron is represented by 29. These two pulses result in a single pulse 30. If two (or more) pulses such as 28 and 29 have a time difference smaller than a certain value T the probability is high that they are caused by a single scintillation and not by noise. The value of T depends on the decay time of the scintillator and the spread in the time of flight of the electrons in the photomultiplier tube. On the other hand the resulting pulse 30 can be distinguished from a single-electron pulse if 28 and 29 have a time difference $\delta T$ not smaller than a minimum of the order of 1 nsec. The mean time difference of two single-electron pulses due to one scintillation depends on the decay time of the scintillator, which is about 2 nsec. for the usual liquid scintillators, and the time spread occurring between the cathode and the anode. Due to the systematic spread in the time of flight between the cathode and the first dynode, which may have values up to 10 nsec., the probability of a time difference $\delta T > 1$ nsec. is very high in spite of the short decay time of the scintillator.

FIG. 8 shows an occurrence similar to that of FIG. 7, but having different amplitude distributions. The same references as in FIG. 7 are used.

There are some pulses due to a scintillation, which are not counted. Among these are the pulses having an extremely small amplitude. The limits depend on the sensibility of the pulse-shape discriminator. Neither pulses resulting from two single-electron pulses having a time difference $\delta T$ greater than T nor pulses resulting from two single-electron pulses having a time difference $\delta T$, which is too small, are counted. It may be emphasized that these three kinds of pulses are very rare and can practically be neglected.

What is claimed is:

1. Scintillation counter arrangement for low-level scintillation counting with discrimination against noise pulses comprising in combination, a liquid scintillator having a decay time of the order of nanoseconds for producing scintillations induced by low energy particles, a pulse-width discriminator and a photomultiplier tube comprising a transparent photocathode, a first dynode spaced from said photocathode, an electron lens system between said photocathode and said first dynode, said photocathode being convex as viewed from the first dynode, and an output electrode, points on the surface of said photocathode being spaced from said first dynode a distance for which there is a systematic spread in the time of flight between the photocathode and the first dynode for electrons originating from said points, the maximum time spread in times of flight being substantially greater than the decay time of the scintillator, said output electrode being connected to said pulse-width discriminator, said discriminator being responsive to multiple electron scintillation pulses, which are relatively broad due to said time spread, and discriminating against single electron noise pulses.

References Cited

UNITED STATES PATENTS

| | | | |
|---|---|---|---|
| 2,433,700 | 12/1947 | Larson | 313—95 X |
| 2,821,633 | 1/1958 | Friedman | 313—95 X |
| 2,836,755 | 5/1958 | Sommer | 313—95 |
| 2,884,345 | 4/1959 | Rocard et al. | 313—94 X |
| 3,082,342 | 3/1963 | Pietri | 313—102 X |
| 3,243,626 | 3/1966 | Helvy et al. | 313—95 |
| 3,280,356 | 10/1966 | Stoudenheimer et al. | 313—94 X |
| 2,897,368 | 7/1959 | Lundberg et al. | 250—71.5 |
| 3,053,982 | 9/1962 | Carlson | 250—71.5 |
| 3,136,902 | 6/1964 | Kerns | 250—71.5 X |
| 3,167,654 | 1/1965 | Scott | 250—71.5 |
| 3,372,127 | 3/1968 | Thomas et al. | 250—71.5 X |

FOREIGN PATENTS 971,493 1/1951 France.

ROBERT SEGAL, Primary Examiner

U.S. Cl. X.R.

313—95, 101